(12) United States Patent
Sato et al.

(10) Patent No.: US 9,155,072 B2
(45) Date of Patent: Oct. 6, 2015

(54) RADIO BASE STATION AND COMMUNICATION CONTROL METHOD SETTING AN ENTIRE FREQUENCY BAND OF A RADIO RESOURCE AS A REFERENCE SIGNAL TRANSMISSION FREQUENCY BAND WITHIN A PREDETERMINED PERIOD

(75) Inventors: Yoshizo Sato, Yawata (JP); Masaaki Nakata, Yamato (JP); Nobuaki Takamatsu, Koto-ku (JP); Masahiro Yagi, Kawasaki (JP); Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 163 days.

(21) Appl. No.: 13/819,656

(22) PCT Filed: Aug. 26, 2011

(86) PCT No.: PCT/JP2011/069355
§ 371 (c)(1),
(2), (4) Date: Mar. 28, 2013

(87) PCT Pub. No.: WO2012/026601
PCT Pub. Date: Mar. 1, 2012

(65) Prior Publication Data
US 2013/0201948 A1    Aug. 8, 2013

(30) Foreign Application Priority Data
Aug. 27, 2010    (JP) .................................. 2010-191343

(51) Int. Cl.
*H04W 72/04*    (2009.01)
*H04B 7/06*    (2006.01)
(Continued)

(52) U.S. Cl.
CPC ............. *H04W 72/04* (2013.01); *H04B 7/0617* (2013.01); *H04L 5/0048* (2013.01); *H04L 5/0082* (2013.01); *H04L 5/0023* (2013.01); *H04W 16/28* (2013.01)

(58) Field of Classification Search
None
See application file for complete search history.

(56) References Cited

U.S. PATENT DOCUMENTS

| 6,141,567 | A | * | 10/2000 | Youssefmir et al. | ....... 455/562.1 |
| 2009/0042616 | A1 | * | 2/2009 | Teo et al. | ................... 455/562.1 |

(Continued)

FOREIGN PATENT DOCUMENTS

| JP | 2009-060595 A | 3/2009 |
| JP | 2010-506543 A | 2/2010 |

OTHER PUBLICATIONS

An Office Action; "Notice of Reasons for Rejection," issued by the Japanese Patent Office on Apr. 8, 2014, which corresponds to Japanese Patent Application No. 2012-530747 and is related to U.S. Appl. No. 13/819,656; with English language statement of relevance.

(Continued)

*Primary Examiner* — Alejandro Rivero
(74) *Attorney, Agent, or Firm* — Studebaker & Brackett PC (57) ABSTRACT

The present invention provides a wireless base station (eNB1-1) that sets a first SRS transmission frequency band as a transmission frequency band for SRS at a first SSF timing and sets the first SRS transmission frequency band as the transmission frequency band for SRS at a second SSF timing, within the time for one frame. In this way, all frequency bands (allocatable frequency bands) for usable downstream resource blocks in wireless communications between the wireless base station (eNB1-1) and a serving wireless terminal (UE2-1) are covered by the first SRS transmission frequency band and the second SRS transmission frequency band.

5 Claims, 6 Drawing Sheets

(51) Int. Cl.
 *H04L 5/00* (2006.01)
 *H04W 16/28* (2009.01)

(56) References Cited

U.S. PATENT DOCUMENTS

2009/0316675 A1 12/2009 Malladi et al.
2011/0188549 A1* 8/2011 Wan et al. ................. 375/213
2012/0178502 A1 7/2012 Teo et al.

OTHER PUBLICATIONS

International Search Report; PCT/JP2011/069355; Oct. 4, 2011.
3GPP TS 36.211 V8.7.0 (May 2009); 3rd Generation Partnership Project; Technical Specification Group Radio Access Network; Evolved Universal Terrestrial Radio Access (E-UTRA); Physical Channels and Modulation (Release 8).

* cited by examiner

RADIO BASE STATION AND COMMUNICATION CONTROL METHOD SETTING AN ENTIRE FREQUENCY BAND OF A RADIO RESOURCE AS A REFERENCE SIGNAL TRANSMISSION FREQUENCY BAND WITHIN A PREDETERMINED PERIOD

TECHNICAL FIELD

The present invention relates to a radio base station of an adaptive array scheme applying an antenna weight to a plurality of antennas, and a communication control method in such a radio base station.

BACKGROUND ART

In 3GPP (Third Generation Partnership Project), in a radio communication system corresponding to LTE (Long term Evolution), for which the standards are being set up currently, a radio base station eNB assigns a radio resource in the radio communication between the radio base station eNB and a radio terminal UE (for example, see Non Patent Literature 1). Furthermore, in a radio communication system corresponding to LTE, either Frequency Division Duplex (FDD) or Time Division Duplex (TDD) is employed in the radio communication between the radio base station eNB and the radio terminal UE.

Moreover, in an LTE (TDD-LTE) radio communication system employing the TDD, there has been discussed a feature where a radio base station eNB performs control for adaptively directing a beam (adaptive array control) toward the radio terminal UE at the time of transmission of a downlink radio signal, in order to ensure communication quality between the radio base station eNB and a radio terminal UE that is moving.

According to a technique of calculating the antenna weight, when a radio base station eNB receives a sounding reference signal (SRS), which is an uplink radio signal from a radio terminal UE, it is considered that the radio base station eNB calculates an antenna weight for a downlink resource block that has a frequency band equal to a frequency band of the SRS.

However, in a TDD-LTE radio communication system, the frequency band that the radio terminal UE can use once for transmitting SRS can be used in the radio communication between the radio base station eNB and the radio terminal UE, in other words, the frequency band is narrower than the entire frequency band of the downlink resource block that can be assigned to the radio terminal UE, and is also fixed. Therefore, even though some of the downlink resource blocks can be assigned, SRS having a frequency band equal to the frequency band of the downlink resource blocks does not exist because of which an antenna weight might not be set.

CITATION LIST

Non Patent Literature

[Non Patent Literature 1] 3GPP TS 36.211 V8.7.0 "Physical Channels and Modulation", MAY 2009

SUMMARY OF INVENTION

A first feature of the present invention is summarized as a radio base station (radio base station eNB 1-1) of an adaptive array scheme applying an antenna weight to a plurality of antennas (antenna 108A, antenna 108B, antenna 108C, antenna 108D), comprising: a control unit (control unit 102) that sets a reference signal transmission frequency band available in the transmission of a reference signal (SRS) from a serving radio terminal (radio terminal UE 2-1), the reference signal being referenced in the calculation of the antenna weight, wherein the control unit switches the reference signal transmission frequency band so that an entire frequency band of a radio resource available in the radio communication between the radio base station and the serving radio terminal becomes the reference signal transmission frequency band, within a predetermined period.

The radio base station described above switches the reference signal transmission frequency band so that the entire frequency band of a radio resource becomes the reference signal transmission frequency band available in the transmission of the reference signal from the serving radio terminal within a predetermined time period. Therefore, even when the reference signal transmission frequency band is narrower than the entire frequency band of the radio resource, the entire frequency band of the radio resource can be used for the transmission of a reference signal within a predetermined time period. Therefore, it becomes possible to calculate the antenna weight for the entire frequency band of the radio resource that can be assigned.

A second feature of the present invention is summarized as that the control unit sets a reference signal transmission time period used for the transmission of the reference signal, at least once, within the duration of a communication frame.

A third feature of the present invention is summarized as that the control unit sets the reference signal transmission time period to a time period shared between an uplink radio communication and a downlink radio communication included in the communication frame.

A fourth feature of the present invention is summarized as the radio base station comprising: a reception unit that receives the reference signal from a serving radio terminal, wherein the control unit preferentially assigns, to the serving radio terminal, a radio resource having a frequency band used for the transmission of a reference signal received at a point of time near a target subframe and before the target subframe.

A fifth feature of the present invention is summarized as a communication control method in a radio base station of an adaptive array scheme applying an antenna weight to a plurality of antennas, comprising: a control step of setting a reference signal transmission frequency band available in the transmission of a reference signal from a serving radio terminal, the reference signal being referenced in the calculation of the antenna weight, wherein the control step includes a step of switching the reference signal transmission frequency band so that an entire frequency band of a radio resource available in the radio communication between the radio base station and the serving radio terminal becomes the reference signal transmission frequency band within a predetermined period.

DESCRIPTION OF EMBODIMENTS

Next, an embodiment of the present invention will be described with reference to the drawings. Specifically, (1) Configuration of radio communication system, (2) Configuration of radio base station, (3) Operation of radio base station, (4) Operation and effect, and (5) Other embodiments will be described. It is to be noted that the same or similar reference numerals are applied to the same or similar parts through the drawings in the following embodiments.

(1) Configuration of Radio Communication System

Figure 1:
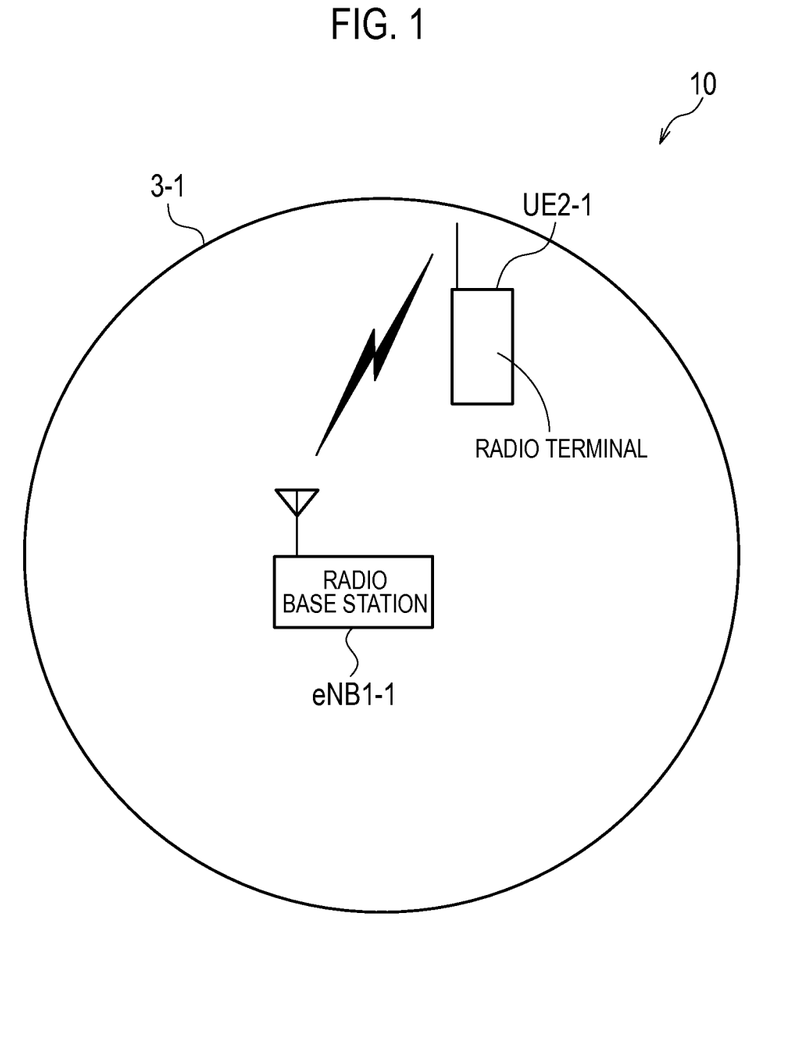
FIG. 1 is a diagram illustrating the entire schematic configuration of a radio communication system according to an embodiment of the present invention.

FIG. 1 is a diagram illustrating the entire schematic configuration of a radio communication system 10 according to the embodiment of the present invention.

The radio communication system 10 illustrated in FIG. 1 is a TDD-LTE radio communication system. The radio communication system 10 includes a radio base station eNB1-1 and a radio terminal UE2-1.

As illustrated in FIG. 1, the radio base station eNB1-1 constitutes E-UTRAN (Evolved-UMTS Terrestrial Radio Access Network). The radio terminal UE2-1 exists in a cell 3-1 that is a communication available area provided by the radio base station eNB1-1.

The radio terminal UE2-1 is a terminal to which a resource block is assigned by the radio base station eNB1-1. In this case, when the radio base station eNB1-1 is set as a reference, the radio terminal UE2-1 is the serving radio terminal. Hereinafter, the radio terminal, to which the resource block is assigned by the radio base station eNB1-1, will be appropriately referred to as a serving radio terminal UE2-1.

While Time Division Duplex is employed in the radio communication between the radio base station eNB1-1 and the radio terminal UE2-1, OFDMA (Orthogonal Frequency Division Multiplexing Access) is employed in the downlink radio communication, and SC-FDMA (Single Carrier Frequency Division Multiple Access) is employed in the uplink radio communication. Furthermore, downlink indicates a direction from the radio base station eNB1-1 to the radio terminal UE2-1. Uplink indicates a direction from the radio terminal UE2-1 to the radio base station eNB1-1.

The radio base station eNB1-1 assigns a resource block (RB) as a radio resource to the serving radio terminal UE2-1 in the cell 3-1.

The resource block includes a downlink resource block (downlink RB) to be used in the downlink radio communication and an uplink resource block (uplink RB) to be used in the uplink radio communication. A plurality of downlink resource blocks are arranged in the frequency direction and the time direction. Similarly, a plurality of uplink resource blocks are arranged in the frequency direction and the time direction.

Figure 2:
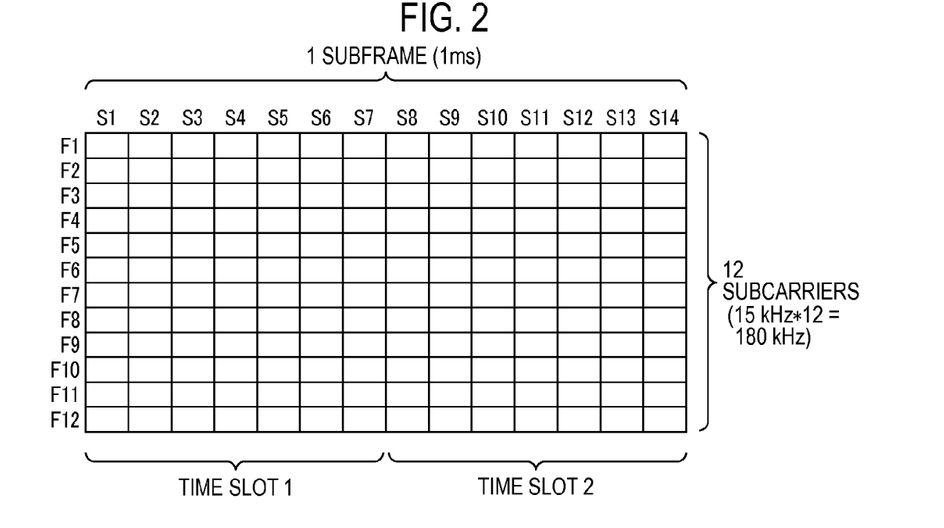
FIG. 2 is a diagram illustrating a format of a resource block according to the embodiment of the present invention.

FIG. 2 is a diagram illustrating a format of the resource block. The resource block is configured in one subframe having a time length of 1 [ms] in the time direction. The subframe includes a time period S1 to a time period S14. Among the time period S1 to the time period S14, the time period S1 to the time period S7 constitute a first half time slot (a time slot 1) and the time period S8 to the time period S14 constitute a latter half time slot (a time slot 2). Also, the time slot 1 and the time slot 2 correspond to the resource block.

As illustrated in FIG. 2, the resource block has a frequency width of 180 [kHz] in the frequency direction. Furthermore, the resource block includes 12 subcarriers F1 to F12 having a frequency width of 15 [kHz].

Figure 3:
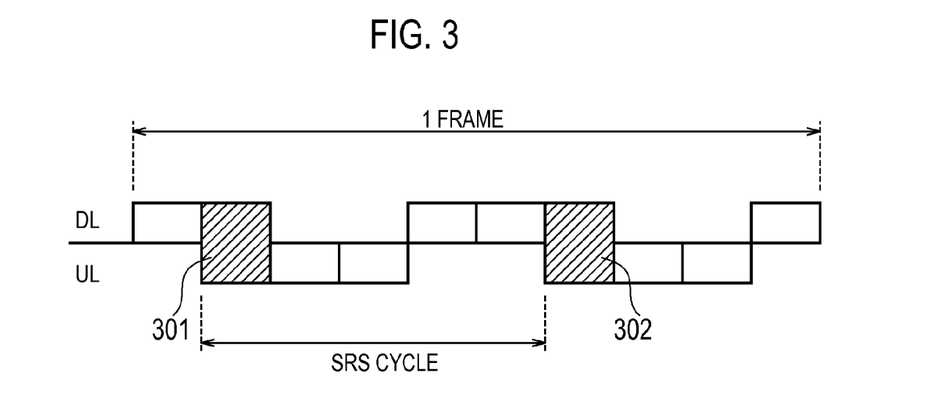
FIG. 3 is a diagram illustrating a format of a frame according to the embodiment of the present invention.

Furthermore, in the time direction, a plurality of subframes constitute one frame. FIG. 3 is a diagram illustrating a format of the frame. The frame illustrated in FIG. 3 includes 10 subframes. The frame includes 10 subframes in the sequence of a subframe of a downlink resource block, subframes (special subframes: SSF) of both the downlink resource block and an uplink resource block, a subframe of the uplink resource block, a subframe of the uplink resource block, a subframe of the downlink resource block, a subframe of the downlink resource block, a special subframe, a subframe of the uplink resource block, a subframe of the uplink resource block, and a subframe of the downlink resource block. In the special subframes, within the subframe, the first half of the time slot is used for downlink radio communication and the latter half of the time slot is used for uplink radio communication across a guard time.

Furthermore, in the frequency direction, the entire frequency band of the radio resource available in the radio communication between the radio base station eNB1-1 and the serving radio terminal UE2-1, in other words, the frequency band that can be assigned to the serving radio terminal UE2-1 (assigned frequency band), has a bandwidth corresponding to the number of a plurality of resource blocks.

Figure 4:
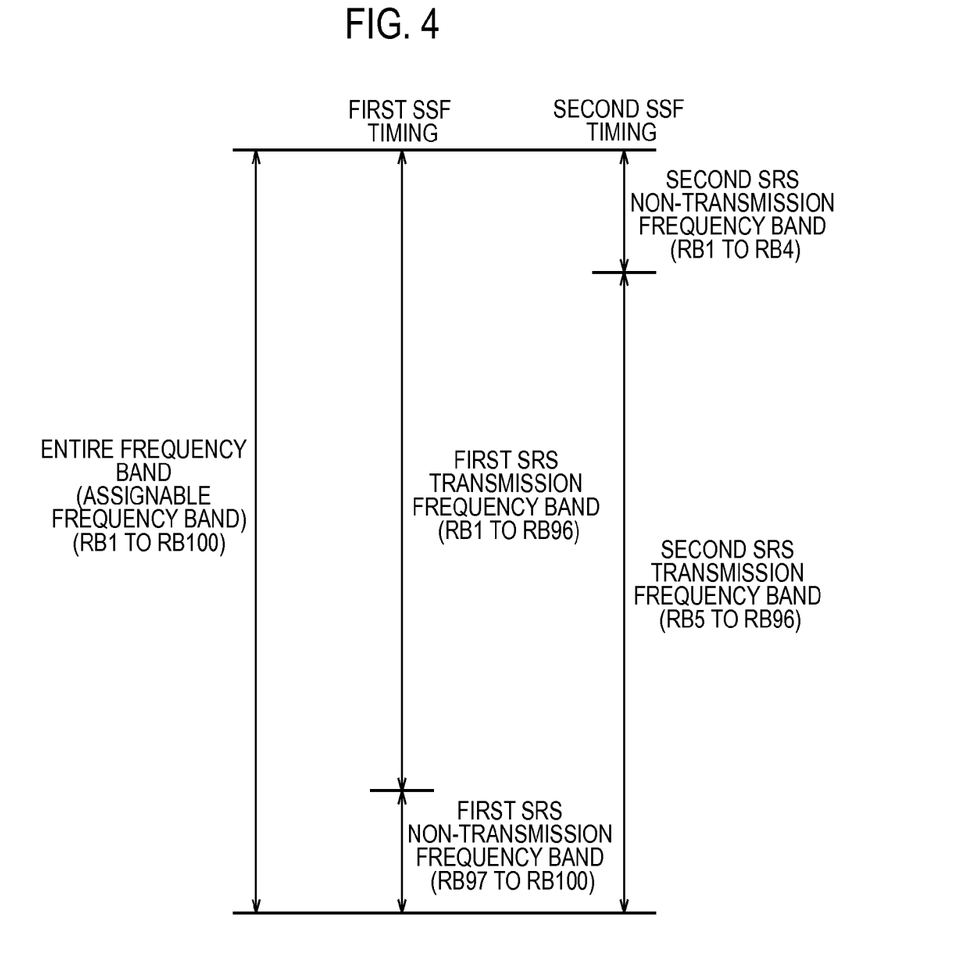
FIG. 4 is a diagram illustrating a configuration of a frequency band of a radio resource available in radio communication between a radio base station and a radio terminal according to the embodiment of the present invention.

FIG. 4 is a diagram illustrating a configuration of the entire frequency band (frequency band that can be assigned) of a radio resource available in the radio communication between the radio base station eNB1-1 and the serving radio terminal UE2-1. As illustrated in FIG. 4, the entire frequency band of the radio resource available in the radio communication between the radio base station eNB1-1 and the serving radio terminal UE2-1 has a bandwidth corresponding to 100 resource blocks (RB1 through RB100).

The downlink resource block is configured by a control information channel (PDCCH: Physical Downlink Control CHannel) for downlink control information transmission and a shared data channel (PDSCH: Physical Downlink Shared CHannel) for downlink user data transmission, in the time direction.

On the other hand, in the uplink resource block, a control information channel (PUCCH: Physical Uplink Control CHannel) for uplink control information transmission is configured at both ends of the entire frequency band available in the uplink radio communication, and a shared data channel (PUSCH: Physical Uplink Shared CHannel) for uplink user data transmission is configured in the central part.

(2) Configuration of Radio Base Station

Figure 5:
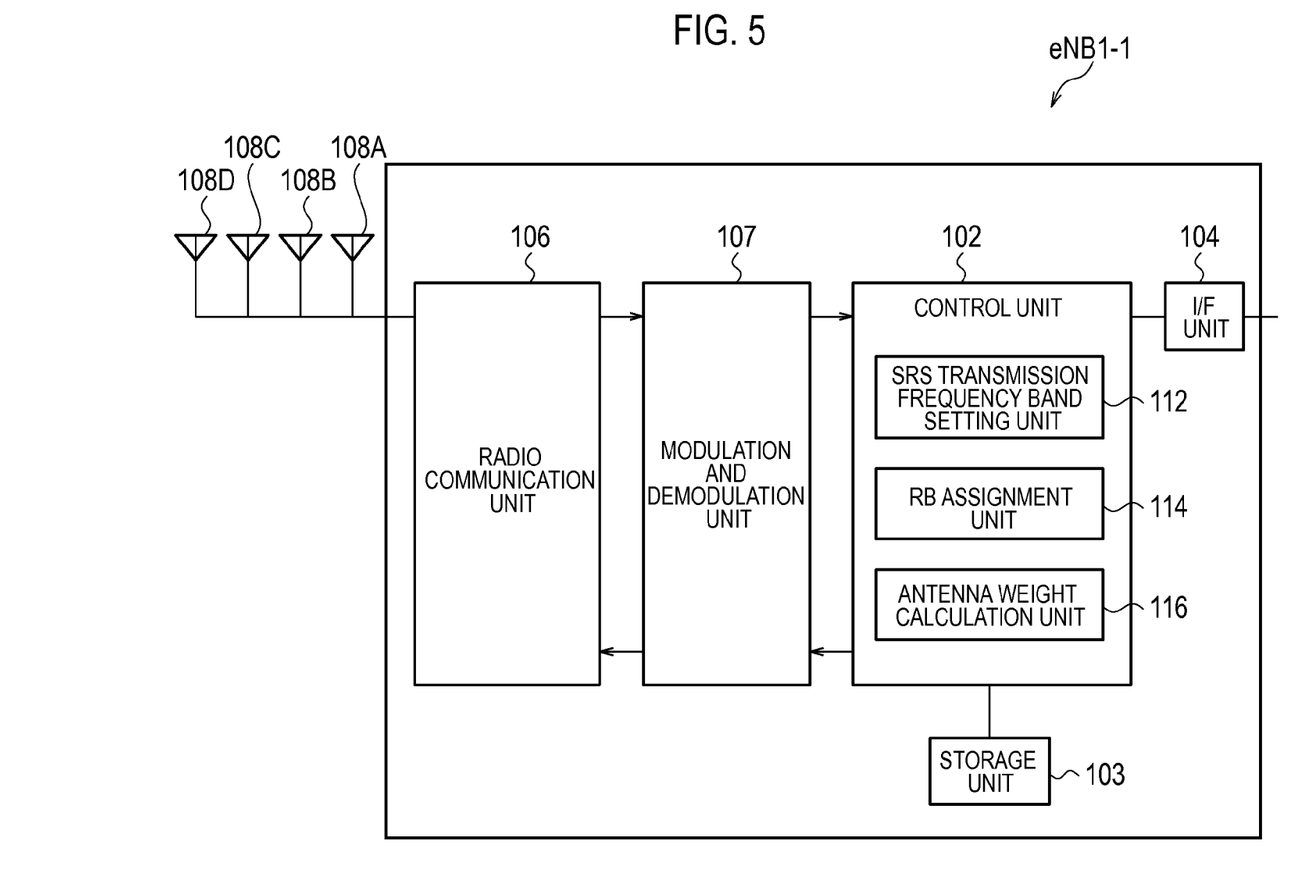
FIG. 5 is a configuration diagram of a radio base station according to the embodiment of the present invention.

FIG. 5 is a configuration diagram of the radio base station eNB1-1. As illustrated in FIG. 5, the radio base station eNB1-1 is a radio base station of an adaptive array scheme applying an antenna weight to a plurality of antennas, and includes a control unit 102, a storage unit 103, an I/F unit 104, a radio communication unit 106, a modulation and demodulation unit 107, an antenna 108A, an antenna 108B, an antenna 108C, and an antenna 108D.

The control unit 102, for example, is configured by a CPU, and controls various functions of the radio base station eNB1-1. The control unit 102 includes a sounding reference signal (SRS) transmission frequency band setting unit 112, a resource block (RB) assignment unit 114, and an antenna weight calculation unit 116. The storage unit 103, for example, is configured by a memory, and stores various types of information used for the control and the like of the radio base station eNB1-1.

The I/F unit 104 is able to communicate with another radio base station eNB through an X2 interface. Furthermore, the I/F unit 104 is able to communicate with EPC (Evolved Packet Core) that is not illustrated in the diagram, more specifically, with MME (Mobility Management Entity)/S-GW (Serving Gateway) through an S1 interface.

The radio communication unit 106 receives an uplink radio signal, which is transmitted from the serving radio terminal UE2-1, through the antenna 108A to the antenna 108D. In addition, the radio communication unit 106 converts (down-converts) the received uplink radio signal to a baseband signal, and outputs the signal to the modulation and demodulation unit 107.

The modulation and demodulation unit 107 performs demodulation and decoding process for the input baseband signal. In this way, data included in the uplink radio signal transmitted from the radio terminal UE2-1 is obtained. The data is output to the control unit 102.

Furthermore, the modulation and demodulation unit 107 performs encoding and modulation of data from the control unit 102, thereby obtaining a baseband signal. The radio communication unit 106 converts (up-converts) the baseband signal to a downlink radio signal. Moreover, the radio communication unit 106 transmits the downlink radio signal through the antenna 108A to the antenna 108D.

The SRS transmission frequency band setting unit 112 of the control unit 102 sets, to the serving radio terminal UE2-1, a frequency band (SRS transmission frequency band) that is used when the serving radio terminal UE2-1 transmits a sounding reference signal (SRS) at a timing of a predetermined special subframe. Furthermore, the SRS is a signal to be referred to in the calculation of an antenna weight in the radio base station eNB1-1, and is an uplink radio signal of a radio frequency band.

Of the 100 downlink resource blocks RB1 through RB100 illustrated in FIG. 4, the number of resource blocks that can be used for one-time SRS transmission is 96. Therefore, to enable the serving radio terminal UE2-1 to transmit the SRS in the entire frequency band of the 100 downlink resource blocks RB1 through RB100, the SRS transmission frequency band setting unit 112 sets the SRS transmission frequency band as described below.

Specifically, the SRS transmission frequency band setting unit 112 sets the frequency band (the first SRS transmission frequency band) made of RB1 through RB96 illustrated in FIG. 4 as the frequency band available at one time during the transmission of SRS, at the timing of the anterior special subframe (first SSF) 301 from among the timing of the two special subframes in the single frame illustrated in FIG. 3. In this case, the frequency band made of RB97 through RB100 becomes the frequency band that is not capable of transmitting the SRS (that is, the first SRS non-transmission frequency band).

Furthermore, the SRS transmission frequency band setting unit 112 sets the frequency band (the second SRS transmission frequency band) made of RB5 through RB100 illustrated in FIG. 4 as the frequency band available at one time during the transmission of SRS, at the timing of the posterior special subframe (second SSF) 302 from among the timing of the two special subframes in the single frame illustrated in FIG. 3. In this case, the frequency band made of RB1 through RB4 becomes the frequency band that is not capable of transmitting the SRS (that is, the second SRS frequency band).

The setting of the above-mentioned first SRS frequency band and the second SRS frequency band is repeated in each frame. In this way, the first SRS transmission frequency band and the second SRS transmission frequency band are set alternately in the serving radio terminal UE2-1. Therefore, in the time period of one frame, the serving radio terminal UE2-1 can transmit the SRS in the entire frequency band that can be assigned.

The SRS transmission frequency band setting unit 112 transmits the information on the first SRS transmission frequency band and the information on the second SRS transmission frequency band that have been set to the serving radio terminal UE2-1.

Specifically, during the connection of the serving radio terminal UE2-1, the SRS transmission frequency band setting unit 112 sets a parameter corresponding to the bandwidth of the first SRS transmission frequency band and the second SRS transmission frequency band (the bandwidth corresponding to 96 RBs), in SoundingRS-UL-Config, that is, the information element of the RRC (Radio Resource Control) Connection Setup message. Furthermore, the SRS transmission frequency band setting unit 112 sets the information on the center frequency of the first SRS transmission frequency band and the information on the center frequency of the second SRS transmission frequency band, in an RRC Connection Setup message.

In addition, the SRS transmission frequency band setting unit 112 outputs to the modulation and demodulation unit 107, the RRC Connection Setup message in which the parameter, as well as the information on the center frequency of the first SRS transmission frequency band and the information on the second SRS transmission frequency is set.

The modulation and demodulation unit 107 performs encoding and modulation of the RRC Connection Setup message to obtain a baseband signal. The radio communication unit 106 converts the baseband signal to a downlink radio signal, and transmits the downlink radio signal through the antenna 108A to the antenna 108D.

Furthermore, during the communication of the serving radio terminal UE2-1, the SRS transmission frequency band setting unit 112 sets a parameter corresponding to the bandwidth of the first SRS transmission frequency band and the second SRS transmission frequency band in SoundingRS-UL-Config, that is, the information element of the RRC Connection Reconfiguration message. Moreover, the SRS transmission frequency band setting unit 112 sets the information on the center frequency of the first SRS transmission frequency band and the information on the center frequency of the second SRS transmission frequency band, in the RRC Connection Reconfiguration message.

In addition, the SRS transmission frequency band setting unit 112 outputs to the modulation and demodulation unit 107, the RRC Connection Reconfiguration message in which the parameter, as well as the information on the center frequency of the first SRS transmission frequency band and the information on the second SRS transmission frequency is set.

The modulation and demodulation unit 107 performs encoding and modulation of the RRC Connection Reconfiguration message to obtain a baseband signal. The radio communication unit 106 converts the baseband signal to a downlink radio signal, and transmits the downlink radio signal through the antenna 108A to the antenna 108D.

The serving radio terminal UE2-1 receives the downlink radio signal corresponding to the RRC Connection Setup message, or the downlink radio signal corresponding to the RRC Connection Reconfiguration.

Moreover, the serving radio terminal UE2-1 recognizes the bandwidth of the first SRS transmission frequency band and the second SRS transmission frequency band based on the parameter set in the RRC Connection Setup message, or the parameter set in the RRC Connection Reconfiguration message, as well as the parameter defined statically in correspondence to the cell 3-1.

Furthermore, the serving radio terminal UE2-1 recognizes the center frequency of the first SRS transmission frequency band and the center frequency of the second SRS transmission frequency band based on the information on the center frequency of the first SRS transmission frequency band and the information on the center frequency of the second SRS transmission frequency band that is set in the RRC Connection Setup message.

Based on the bandwidth of the first SRS transmission frequency band and the bandwidth of the second SRS transmission frequency band, as well as the center frequency of the first SRS transmission frequency band and the center frequency of the second SRS transmission frequency band, the serving radio terminal UE2-1 uniquely identifies the first SRS transmission frequency band and the second SRS transmission frequency band. Thus, the serving radio terminal UE2-1 transmits the SRS at the timing of the first SSF by using the first SRS transmission frequency band. Furthermore, the serving radio terminal UE2-1 transmits the SRS at the timing of the second SSF by using the second SRS transmission frequency band.

The radio communication unit 106 of the radio base station eNB1-1 receives the SRS that is transmitted from the serving radio terminal UE2-1, through the antenna 108A to the antenna 108D. In addition, the radio communication unit 106 converts the received SRS to a baseband signal, and outputs the signal to the modulation and demodulation unit 107. Furthermore, the radio communication unit 106 outputs the information on the frequency band of the received SRS to the control unit 102. The modulation and demodulation unit 107 performs demodulation and decoding process for the input baseband signal. In this way, the data included in the SRS transmitted by the radio terminal UE2-1 is obtained. The data is output to the control unit 102.

The RB assignment unit 114 assigns a downlink resource block to the serving radio terminal UE2-1.

The RB assignment unit 114 employs the PF (Proportional Fair) scheme to determine the frequency band of the downlink resource block that can be assigned to the serving radio terminal UE2-1.

Next, the RB assignment unit 114 determines the time period of the downlink resource block to be assigned. If the timing of the most recent SSF is the timing of the first SSF, the RB assignment unit 114 determines the time period of at least any one of the subframes of the downlink resource blocks during the time period from the timing of the first SSF up to the timing of the next second SSF. Furthermore, if the timing of the most recent SSF is the timing of the second SSF, the RB assignment unit 114 determines the time period of at least one of the subframes of the downlink resource blocks during the time period from the timing of the second SSF up to the posterior-most point of the frame including the second SSF.

In addition, the RB assignment unit 114 generates a downlink RB assignment value that can uniquely identify a frequency band and a time period of the determined downlink resource block. The downlink RB assignment value is obtained by a process of a medium access control (MAC) layer. The downlink RB assignment value includes a resource block number indicating the information for uniquely identifying a time period and a frequency band of the downlink resource block to be assigned to the serving radio terminal UE2-1.

The RB assignment unit 114 transmits the downlink RB assignment value to the serving radio terminal UE2-1 through the modulation and demodulation unit 107, the radio communication unit 106, and the antenna 108A to the antenna 108D.

After the downlink resource block has been assigned by the RB assignment unit 114, the antenna weight calculation unit 116 calculates the antenna weight (a transmission weight) during the transmission of the downlink radio signal using the assigned downlink resource block, for each antenna 108A to the antenna 108D.

Specifically, the antenna weight calculation unit 116 identifies the frequency band of a downlink resource block assigned to the serving radio terminal UE2-1, based on the downlink RB assignment value generated by the RB assignment unit 114. Next, the antenna weight calculation unit 116 determines whether or not the frequency band of the assigned downlink resource block is included in the frequency band of the SRS received at the timing of the immediately-preceding SSF.

If the frequency band of the assigned downlink resource block is included in the frequency band of the SRS received at the timing of the immediately-preceding SSF, the antenna weight calculation unit 116 calculates the transmission weight based on the SRS received at the timing of the immediately-preceding SSF. Then, the antenna weight calculation unit 116 calculates an antenna weight (a reception weight), at which a signal-to-interference noise ratio (SINR) at the time of reception of the SRS from the serving radio terminal UE2-1 is maximum, and sets the reception weight as the transmission weight.

The calculated reception weight of each of the antenna 108A to the antenna 108D is the antenna weight at which the SINR is the maximum at the time of reception of the uplink radio signal from the serving radio terminal UE2-1. Accordingly, the reception weights are set as the transmission weights, so that the transmission weights are antenna weights at which a desired wave direction of a beam is directed to the serving radio terminal UE2-1.

If the frequency band of the assigned downlink resource block is not included in the frequency band of the SRS received at the timing of the immediately-preceding SSF, the antenna weight calculation unit 116 calculates the transmission weight based on the SRS received most recently from among the SRS including the frequency band of the assigned downlink resource block. The antenna weight calculation unit 116 calculates the reception weight at which the SINR is the maximum at the time of reception of the SRS from the serving radio terminal UE2-1, and sets the reception weight as the transmission weight.

Following that, the control unit 102 transmits the downlink radio signal to the serving radio terminal UE2-1, through the modulation and demodulation unit 107, the radio communication unit 106, and the antenna 108A to the antenna 108D, by using the assigned downlink resource block.

The calculated reception weight of each of the antenna 108A to the antenna 108D is the antenna weight at which the SINR is the maximum at the time of reception of the uplink radio signal from the serving radio terminal UE2-1. Accordingly, the reception weights are set as the transmission weights, so that the transmission weights are antenna weights at which a desired wave direction of a beam is directed to the serving radio terminal UE2-1.

(3) Operation of Radio Base Station

Figure 6:
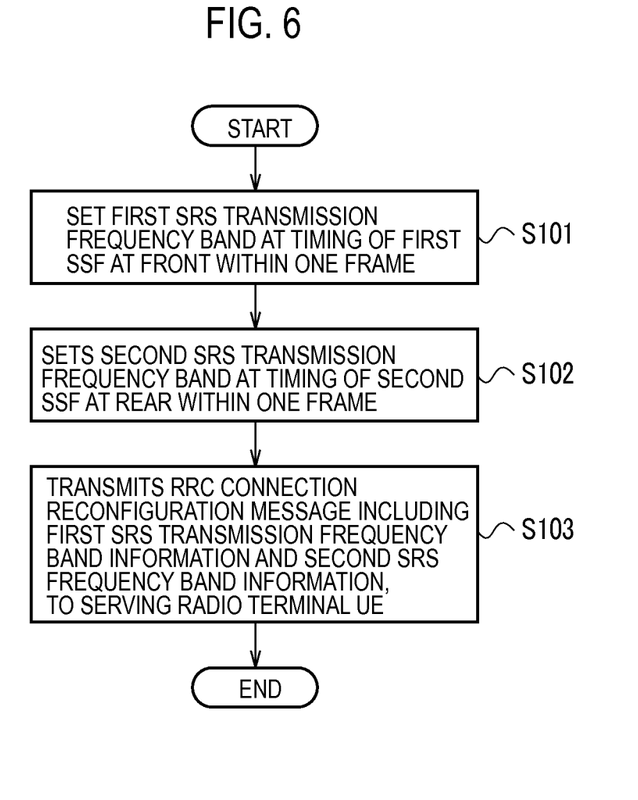
FIG. 6 is a flowchart illustrating a first operation of the radio base station according to the embodiment of the present invention.

FIG. 6 is a flowchart illustrating a first operation of the radio base station eNB1-1.

In step S101, the SRS transmission frequency band setting unit 112 of the radio base station eNB1-1 sets the first SRS transmission frequency band at the timing of the first SSF.

In step S102, the SRS transmission frequency band setting unit 112 sets the second SRS transmission frequency band at the timing of the second SSF.

In step S103, the SRS transmission frequency band setting unit 112 transmits an RRC Connection Reconfiguration message including the information on the first SRS transmission frequency band and the information on the second SRS frequency band to the serving radio terminal UE2-1.

Figure 7:
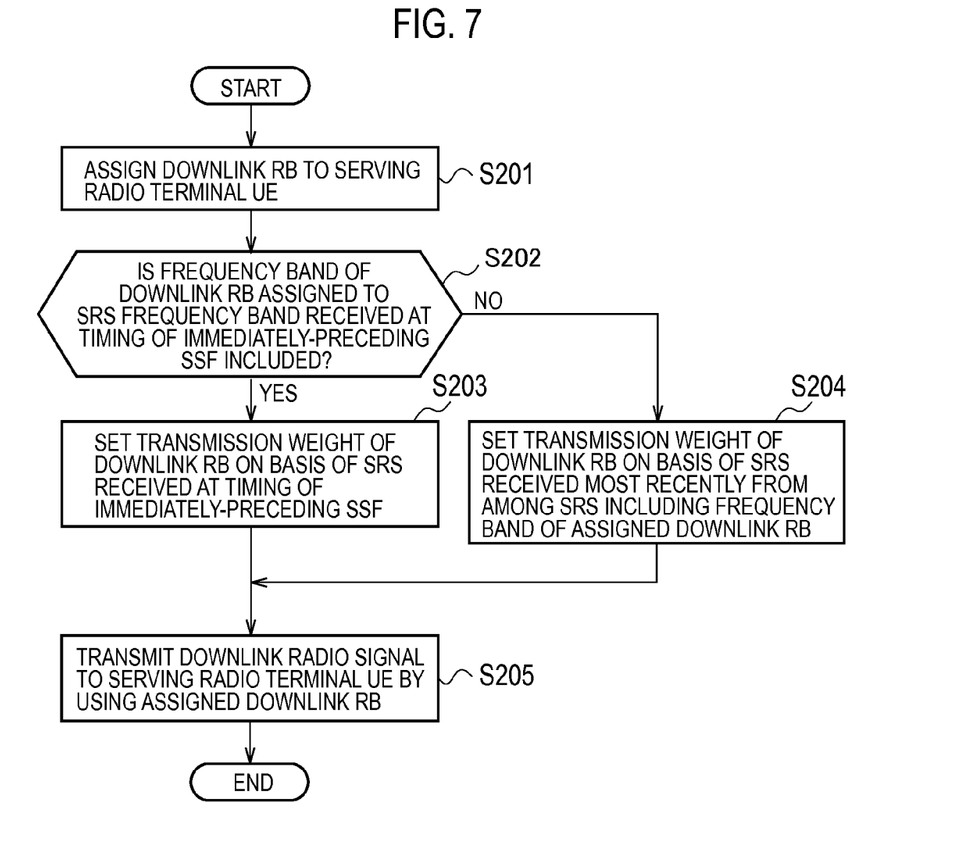
FIG. 7 is a flowchart illustrating a second operation of the radio base station according to the embodiment of the present invention.

FIG. 7 is a flowchart illustrating a second operation of the radio base station eNB1-1. The operation illustrated in FIG. 7 is performed after the operation illustrated in FIG. 6.

In step S201, the RB assignment unit 114 of the radio base station eNB1-1 assigns a downlink resource block to the serving radio terminal UE2-1.

In step S202, the antenna weight calculation unit 116 of the radio base station eNB1-1 determines whether or not the frequency band of the assigned downlink resource block is included in the frequency band of the SRS received at the timing of the immediately-preceding SSF.

If the frequency band of the assigned downlink resource block is included in the frequency band of the SRS received at the timing of the immediately-preceding SSF, then in step S203, the antenna weight calculation unit 116 calculates the antenna weight (transmission weight) during the transmission of the downlink radio signal using the assigned downlink resource block, based on the SRS received at the timing of the immediately-preceding SSF.

On the other hand, if the frequency band of the assigned downlink resource block is not included in the frequency band of the SRS received at the timing of the immediately-preceding SSF, then in step S204, the antenna weight calculation unit 116 calculates the transmission weight based on the SRS received most recently from among the SRS including the frequency band of the assigned downlink resource block.

After the calculation of the transmission weight in step S203 or step S204, the control unit 102 of the radio base station eNB1-1 transmits the downlink radio signal to the serving radio terminal UE2-1 using the assigned downlink resource block, in step S205.

(4) Operation and Effect

As described above, according to the present embodiment, within the time period of one frame, the radio base station eNB1-1 sets the first SRS transmission frequency band as the transmission frequency band of the SRS at the timing of the first SSF, and sets the second SRS transmission frequency band as the transmission frequency band of the SRS at the timing of the second SSF. In this way, the entire frequency band (the frequency band that can be assigned) of the downlink resource block available in the radio communication between the radio base station eNB1-1 and the serving radio terminal UE2-1 is covered by the first SRS transmission frequency band and the second SRS transmission frequency band. Therefore, even when the first SRS transmission frequency band and the second SRS transmission frequency band are narrower than the frequency band that can be assigned, the entire frequency band that can be assigned within the time period of one frame is used for the transmission of the SRS. Thus, it is possible to calculate the transmission weight for the frequency band that can be assigned.

(5) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, because the first SRS transmission frequency band is set at the timing of the first SSF, and the second SRS transmission frequency band is set at the timing of the second SSF, the entire frequency band that can be assigned is covered. However, the entire frequency band that can be assigned may also be covered by setting three or more SRS transmission frequency bands.

Furthermore, in the aforementioned embodiment, the entire frequency band that can be assigned was covered by setting different SRS transmission frequency bands within the time period of one frame. However, the entire frequency band that can be assigned may be covered by setting different SRS transmission frequency bands within a time period that is either shorter or longer than the time period of one frame.

In the aforementioned embodiments, the timing of the special subframe was used as the transmission timing of SRS in the serving radio terminal UE2-1. However, the transmission timing of the SRS is not limited thereto, and it is sufficient if the transmission timing of the SRS is a timing agreed in advance between the radio base station eNB1-1 and the serving radio terminal UE2-1. However, it is preferable that the transmission timing of the SRS exists once in a time of at least one frame.

Furthermore, in the aforementioned embodiments, the radio base station eNB1-1 used the reception weight as the transmission weight. However, the transmission weight may be calculated independently of the reception weight.

In the aforementioned embodiments, the TDD-LTE radio communication system was described. However, the present invention can be applied in the same manner to all types of radio communication systems in which asymmetric radio communication in which a frequency band of an uplink radio signal to be assigned to a radio terminal is different from a frequency band of a downlink radio signal is employed. Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-191343 (filed on Aug. 27, 2010) is incorporated in the present specification by reference.

INDUSTRIAL APPLICABILITY

According to the present invention, it is possible to provide a radio base station and a communication control method by which the setting of an antenna weight for a downlink radio resource can be performed accurately.

The invention claimed is:

1. A radio base station of an adaptive array scheme applying an antenna weight to a plurality of antennas, comprising:
   a control unit that sets a reference signal transmission frequency band available in a transmission of a reference signal from a serving radio terminal, the reference signal being referenced in a calculation of the antenna weight, wherein the control unit sets a first reference signal transmission frequency band that is used by the serving radio terminal for the transmission of the reference signal at a first time within a predetermined period and sets a second reference signal transmission frequency band that is used by the serving radio terminal for the transmission of the reference signal at a second time within the predetermined period when the reference signal transmission frequency band is narrower than a frequency band that can be assigned to the serving radio terminal, and in a circumstance where a transmission frequency band assigned to the serving radio terminal is not included in a frequency band of a currently received reference signal, the control unit responds by calculating the antenna weight for the serving radio terminal based on a received most recently reference signal including the transmission frequency band.

2. The radio base station according to claim 1, wherein the first reference signal transmission frequency band and the second reference signal transmission frequency band cover the frequency band that can be assigned.

3. The radio base station according to claim 1, wherein if a transmission frequency band assigned to the serving radio terminal is included in a frequency band of a currently received reference signal, the control unit calculates the antenna weight for the serving radio terminal based on the currently received reference signal.

4. A communication control method in a radio base station of an adaptive array scheme applying an antenna weight to a plurality of antennas, comprising:

a control step of setting a reference signal transmission frequency band available in a transmission of a reference signal from a serving radio terminal, the reference signal being referenced in a calculation of the antenna weight, wherein the control step includes a step of setting a first reference signal transmission frequency band that is used by the serving radio terminal for the transmission of the reference signal at a first time within a predetermined period and setting a second reference signal transmission frequency band that is used by the serving radio terminal for the transmission of the reference signal at a second time within the predetermined period when the reference signal transmission frequency band is narrower than a frequency band that can be assigned to the serving radio terminal, and in a circumstance where a transmission frequency band assigned to the serving radio terminal is not included in a frequency band of a currently received reference signal, a control unit responds by calculating the antenna weight for the serving radio terminal based on a received most recently reference signal including the transmission frequency band.

5. A radio base station of an adaptive array scheme applying an antenna weight to a plurality of antennas, comprising:

a control unit that sets a reference signal transmission frequency band available in a transmission of a reference signal from a serving radio terminal, the reference signal being referenced in a calculation of the antenna weight, wherein the control unit sets the reference signal transmission frequency band separated at a plurality of times within a predetermined period to enable the serving radio terminal to transmit the reference signal at a time when the reference signal transmission frequency band is narrower than a frequency band that can be assigned to the serving radio terminal, and in a circumstance where a transmission frequency band assigned to the serving radio terminal is not included in a frequency band of a currently received reference signal, the control unit responds by calculating the antenna weight for the serving radio terminal based on a received most recently reference signal including the transmission frequency band.

* * * * *